May 4, 1937. T. A. WALSH 2,079,474
DUST AND FUME SAMPLER
Filed Dec. 11, 1935
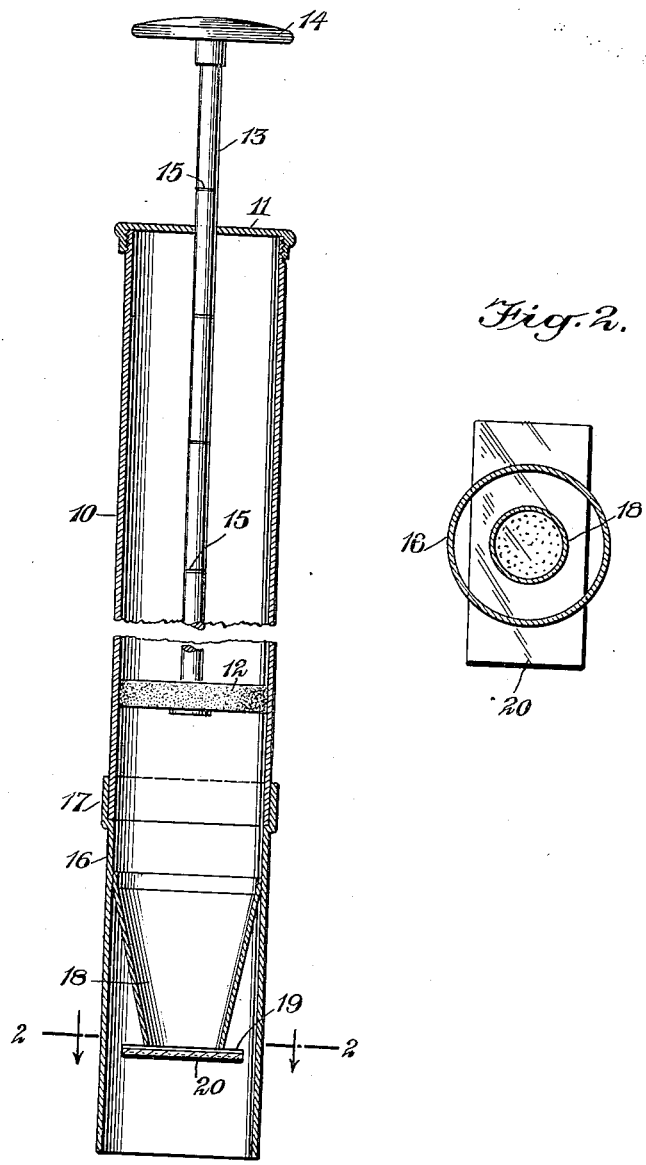
INVENTOR
Thomas A. Walsh Patented May 4, 1937

2,079,474

UNITED STATES PATENT OFFICE 2,079,474

DUST AND FUME SAMPLER

Thomas A. Walsh, Bronxville, N. Y.

Application December 11, 1935, Serial No. 53,998

2 Claims. (Cl. 73—51)

This invention relates to a device for use in testing the dust, fume and mist content of air in industrial, manufacturing and commercial plants, factories and other occupational areas.

The principal object of the invention is the provision of a device of the indicated character which is simple, inexpensive and effectual, and by virtue of which hazards and dangers with regard to occupational diseases may be reliably determined by simple procedure according to microscopic and colorimetric standards.

The nature of the invention and its distinguishing features and advantages will appear when the following specification is read in connection with the accompanying drawing in which—

Fig. 1 is a central longitudinal section of a device embodying features of the invention for use in testing or determining the dust microbic content of air, portions of the device being broken away.

Fig. 2 is a section taken on the line 2—2 of Fig. 1.

The device illustrated in the drawing for testing or determining the dust or microbic content of air includes a suitable collector of the matter to be examined. In the present instance the collector is a pump consisting of a cylinder 10 open at one end, and its other end having a removable cap 11. A plunger 12 is movable in the cylinder 10. A rod 13 is connected with the plunger 12 and projects outwardly through the cap 11, and the outer end of said rod 13 has a manipulating knob 14. The rod 13 has suitable graduations 15. The device also includes a tube 16 equal in diameter to the cylinder 10. The upper end of the tube 16 is enlarged to provide coupling means 17. A frusto-conical element 18 is secured within the tube 16 intermediate the ends thereof, which serves as a nozzle. The tube 16 has transverse slots 19 on the opposite sides thereof at the discharge or outlet end of the nozzle 18. The slots 19 receive a slide 20 of suitable form so as to be disposed crosswise of the tube 16 in proximity to the discharge or outlet end of the nozzle 18. A definite area of the slide is prepared with suitable adhesive substance to hold the dust or microbic particles when delivered thereto. The width of the slots 19 is greater than the thickness of the slide 20 with its adhesive coating so as not to remove the adhesive when inserting the slide, and also to allow the escape of air from the nozzle 18.

The procedure for making the test is as follows. The plunger 12 is drawn inwardly of the cylinder 10 by pulling on the knob 14, to take in or collect a sample of the air to be tested for dust or other microbic content. A slide 20 is extended in the slots 19 to be disposed crosswise of the tube 16. The open end of the cylinder 10 is engaged with the coupling means 17 so as to bring the tube 16 in axial alinement with the cylinder 10. The device in upright position is allowed to stand a suitable length of time, which may be ten minutes for instance. The knob 14 is then manipulated to move the plunger 12 downwardly one graduation at a time at suitable intervals to cause the natural precipitation of dust particles or microbic matter, if any, on the slide, it being apparent that the air is somewhat compressed by the nozzle 18 in the movement of the plunger 12 toward said nozzle. The slide 20 may then be removed and the examination completed according to the desired standards and capacity of the various parts of the device.

I claim:

1. A device of the character described comprising a cylinder open at one end, a plunger movable in the cylinder, a tube detachably engageable with the open end of the cylinder to communicate therewith, a nozzle within the tube forming a restricted passage in continuation of the interior thereof, said tube having aligned slots in opposite walls, and a specimen slide positioned in the slots and located across the end of the nozzle.

2. A device of the character described comprising a cylinder open at one end, a plunger movable in the cylinder, a tube detachably engageable with the open end of the cylinder to communicate therewith, a nozzle within the tube forming a restricted passage in continuation of the interior thereof, said tube having aligned slots in opposite walls, a specimen slide positioned in the slots and located across the end of the nozzle, a rod fixed to the plunger and projecting through the end of the cylinder, and graduations on the rod indicating step-by-step movements of the rod and plunger in discharging the contents of the cylinder against the specimen slide.

THOMAS A. WALSH.